United States Patent [19]

Gaucheron

[11] 3,790,710

[45] Feb. 5, 1974

[54] SYNCHRONIZING DEVICE FOR A TELEVISION SCANNING EQUIPMENT

[75] Inventor: Jean Marie Gaucheron, Paris, France

[73] Assignee: Thomson-CSF, Paris, France

[22] Filed: Feb. 1, 1972

[21] Appl. No.: 222,515

[30] Foreign Application Priority Data

Oct. 18, 1971 France .............................. 7137304

[52] U.S. Cl. .......................................... 178/69.5 DC
[51] Int. Cl. ............................................... H04n 5/04
[58] Field of Search ............................ 178/69.5 DC

[56] References Cited

UNITED STATES PATENTS

| | | | |
|---|---|---|---|
| 3,047,658 | 7/1962 | March | 178/69.5 DC |
| 3,165,585 | 1/1965 | James | 178/69.5 DC |
| 3,337,688 | 8/1967 | Hiatt, Jr. | 178/69.5 DC |

FOREIGN PATENTS OR APPLICATIONS

| | | | |
|---|---|---|---|
| 961,228 | 6/1964 | Great Britain | 178/69.5 DC |

*Primary Examiner*—Howard W. Britton
*Assistant Examiner*—George G. Stellar
*Attorney, Agent, or Firm*—Cushman, Darby & Cushman

[57] ABSTRACT

All the signals necessary for the operation of the camera are derived, as concerns the line frequency signals, from the output of a generator at the line frequency located in the camera and phase locked to the incoming line frequency sync. signal by means of a feedback loop including a variable delay device, and, as concerns the field frequency signals, from a basic field frequency signal delivered by a circuit comprising means for generating a signal at the frequency 2F, where F is the line frequency and whose phase is determined by the incoming line frequency sync. signal, and a counter fed by the signal at the frequency 2F through a further variable delay device.

2 Claims, 3 Drawing Figures

SYNCHRONIZING DEVICE FOR A TELEVISION SCANNING EQUIPMENT

The present invention relates to a novel synchronizing device for television scanning equipments, which enables video signals to be supplied with a phase which leads the synchronizing signals coming from a central control, by a variable amount, this in order to make it easier for said central control to effect the mixing, with the correct phases, of video signals coming from different television scanning equipments.

According to the invention, there is provided a synchronizing device for a television scanning equipment, comprising synchronizing circuits located respectively in the camera and the channel control of the equipment, which circuits will respectively be referred to as "camera circuits" and "channel control circuits," said channel control circuits being supplied from an external source with a signal made up of mixed line and field sync. signals from an external reference, or signals which enable such a signal to be reconstituted, the latter being referred to as the "input mixed sync. signal;"

said camera circuits comprising : a line frequency generator having a phase control input;

said control channel circuits comprising : a phase comparator having a first input for receiving the line sync. signals of the input mixed sync. signal, a second input, and an output coupled to said phase control input; a variable delay device having an input coupled to said line frequency generator and an output coupled to said second input of said phase comparator; and a further circuit hereinafter referred to as the phase lead field frequency circuit for generating a basic field frequency signal having a phase lead, relatively to the phase of the corresponding signal associated with said input mixed sync. signal, said phase-lead field frequency circuit comprising means for generating a signal whose frequency is twice the line frequency F and whose phase is determined by that of the line sync. signals of said input mixed sync. signal, and a counter supplied with said signal of frequency 2F through a further variable delay device;

said synchronizing device comprising means for generating the line frequency signals for the operation of said camera with respective phases determined by that of the output signal from said generator; and means for generating the field frequency signals for the operation of said camera with respective phases determined by that of said basic field frequency signal.

The invention will be better understood and other of its features rendered apparent, from a consideration of the ensuing description and the related drawings in which.

It will be assumed by way of example, that the camera operates with a standard in which the frame frequency is 50 c/s, and the number of lines in a complete image 625 , the scanning being interlaced, which corresponds to a line frequency of 15,625 c/s.

Figure 1:
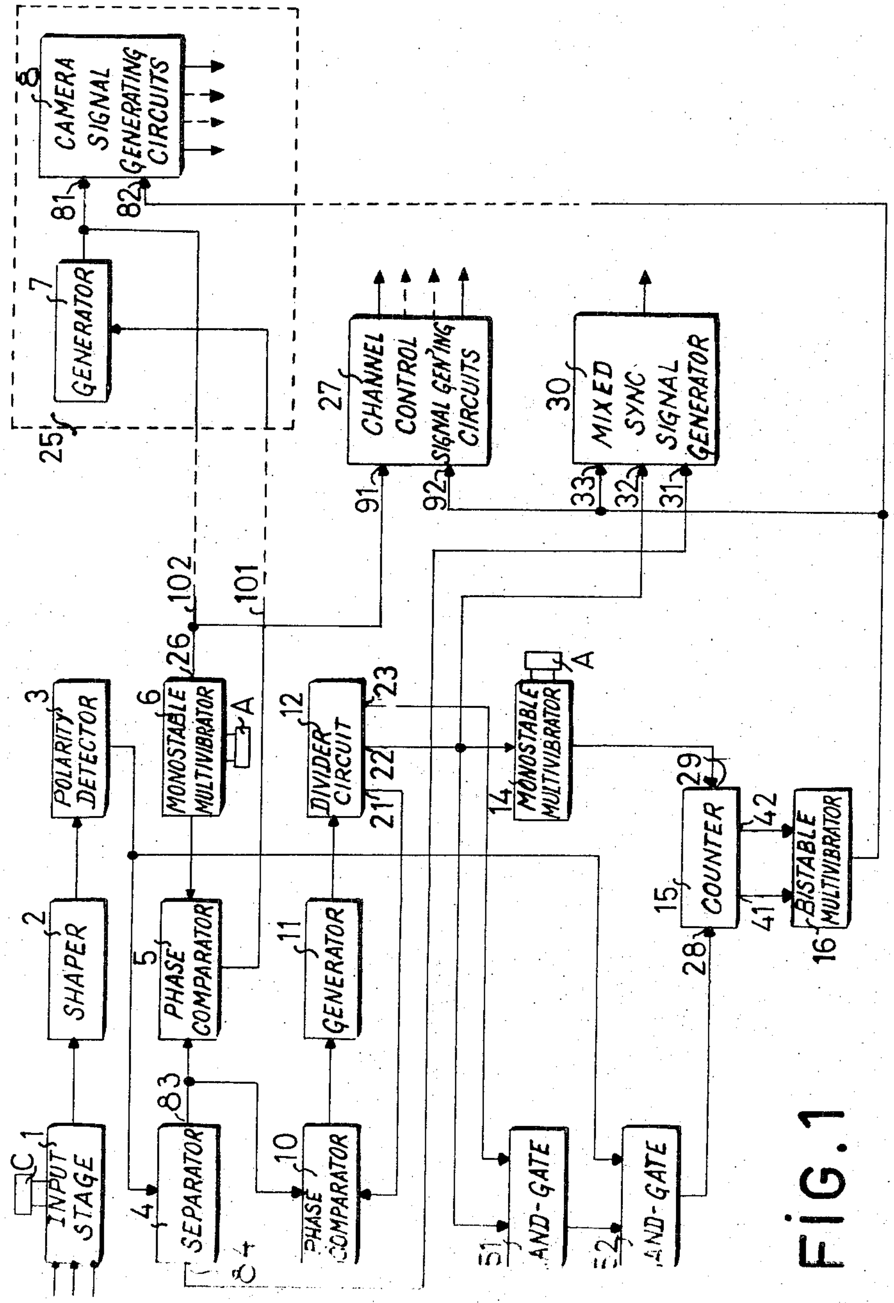
FIG. 1 is the block diagram of an embodiment of a camera equipment in accordance with the invention.

FIG. 1 schematically illustrates an embodiment of a synchronizing device in accordance with the invention, assumed here to be applied to a television camera equipment. The parts of the device which are located in the camera are shown inside a dotted line box 25, the other elements being located in the channel control of the equipment and the connections between the channel control and the camera being symbolized by wires, part of which are marked in dotted line.

This being so, the channel control comprises an input stage 1 with three inputs designed respectively to receive as "input synchronization" either the mixed line and field sync. signals, which set of signals is commonly referred to as the "mixed sync. signal," or a complete video signal, or a particular signal from which the mixed sync. signal may be derived, and supposed here to b e the standard signal referred to as the "?°2 base signal" of the ORTF (Office de Radiodiffusion-Television Francaise).

Stage 1 comprises a switching device manually operated by an element represented symbolically as a knob C . This manual control makes it possible, if the "mixed sync. signal" is received directly (positive or negative), to direct it to the output of stage 1 while a complete video signal is directed to said output through a device suppressing therefrom all but the mixed sync. signal, and a "no. 2 base signal" is directed to said output by a decoder device which reconstitutes the mixed sync. signal from said base signal.

The output of the input stage 1 is connected to a conventional shaper circuit 2 which regenerates the mixed sync. pulses. The output of the circuit 2 is connected to the input of a device 3 which detects the polarity of these pulses and, if necessary, reverses their polarity so that at the output of the device 3 the mixed sync. signal always appears with the same polarity.

The output of the device 3 supplies a separator 4 whose output 83 delivers the line sync. pulses H .

It should be pointed out that irrespective of the phase lead which can be adjusted to accord with the requirements of the central control, all the signals at the line frequency $F=1/T$, which are utilized in the equipment, should have a phase taking account of the length of the cable or cables employed for linking the camera and the channel control, which length may vary from only a few metres to as much as 2,000 metres.

To this end, the equipment is provided with a control loop by which a line frequency (15,625 c/s) generator 7 , incorporated in the camera, can be given a phase which is independent of the length of the linking cables. This same loop is utilized to give the generator a phase which is a function of the phase lead required in the output signals from the equipment in relation to the input synchronization. It will be assumed for the present purposes that this phase lead is variable between 0 and 5$\mu$s and it will be designated by the term "general phase lead," and the signals correspondingly advanced in phase as the "leading" signals.

The generator 7 here produces the line frequency signal known as the preblanking signal, which starts around 0.5$\mu$s later and finishes about 0.5$\mu$s earlier than the line blanking signal, and makes it possible to carry out a first blanking operation in the camera.

The circuit controlling the phase of the generator 7 comprises, in a manner known per se, a phase comparator 5 supplied at its first input with the line sync. pulses H of the input mixed sync. signal, delivered by the separator 4, and at its second input, through the connection 102, with the output signal from the generator 7, the comparator, through the connection 101, controlling the phase of the generator 7; However, here, a variable delay device 6 is arranged in the channel control between the output of the generator 7 and the phase comparator 5. This delay device 6 is a monostable multivibrator, the duration of whose quasi-stable state may be varied by means of a control knob A. It will immediately be apparent that the generator 7 can thus be given a variable phase lead, taking into account both the due lead between the start of the preblanking pulses in relation to the corresponding line sync. pulses, and the general phase lead which it is desired to achieve in relation to the input synchronization.

The output pulses from the generator 7 are applied to the first input 81 of circuits 8 which deliver the requisite signals for the operation of the camera. It will immediately be obvious that from preblanking pulses which have a desired phase in relation to the input signal, it is possible to obtain any line frequency signal necessary for the operation of the camera, with a phase which takes account of the general phase lead, this by means of two monostable multivibrators in series, one of which determines the start of the desired signal and the other its duration.

The output pulses from the generator 7 are on the other hand taken at the input 26 of the delay device 6 in order to supply the first input 91 of circuits 27 delivering the line or field frequency signals employed in the channel control, this to the exclusion of the signals involved in the composition of the "leading" mixed sync. signal.

In these circuits 27, the line frequency signals are generated, as in the circuits 8, by means of monostable multivibrators. It should be pointed out that as far as the line blanking signal is concerned, this, since it can only be triggered by the leading edge of the line preblanking signal, will have a slight delay in relation to its nominal leading phase and will therefore only be incorporated into the output video signals from the camera after these latter have been delayed by $0.5\mu s$, the corresponding delay being in fact in large part supplied by the video amplifiers.

The circuits 27 are supplied on the other hand, at a second input 92, with a "leading" blanking signal, enabling the "leading" mixed blanking signal to be obtained.

This "leading" field blanking signal is obtained in the channel control by means of the circuit which is now to be described:

This circuit incorporates a generator 11 delivering rectangular waveform signals, whose frequency is a multiple p.F of the line frequency F, making it obtain, by means of a divider circuit 12, the frequencies F, 2F and 4F which respectively appear at the outputs 21, 22 and 23 of the divider circuit 12, the corresponding three signals being referred to hereinafter as $A_1$, $A_2$ and $A_4$. This generator 11 is phase-locked to the input synchronization signal by means of a phase comparator 10 whose first input receives the pulses H coming from the separator 4, and whose second input receives the signal $A_1$ of frequency F.

it should be pointed out that the signal of frequency F appearing at the output 21 of the divider circuit 12 is a rectangular waveform signal, the phase of which is substantially identical to that of the pulses H of the input sync. signal. In fact, the phase comparator introduces a constant delay of $2\mu s$ for exemple. The signals $A_2$ and $A_4$ at frequencies 2F and 4F, have corresponding phases.

Figure 2:
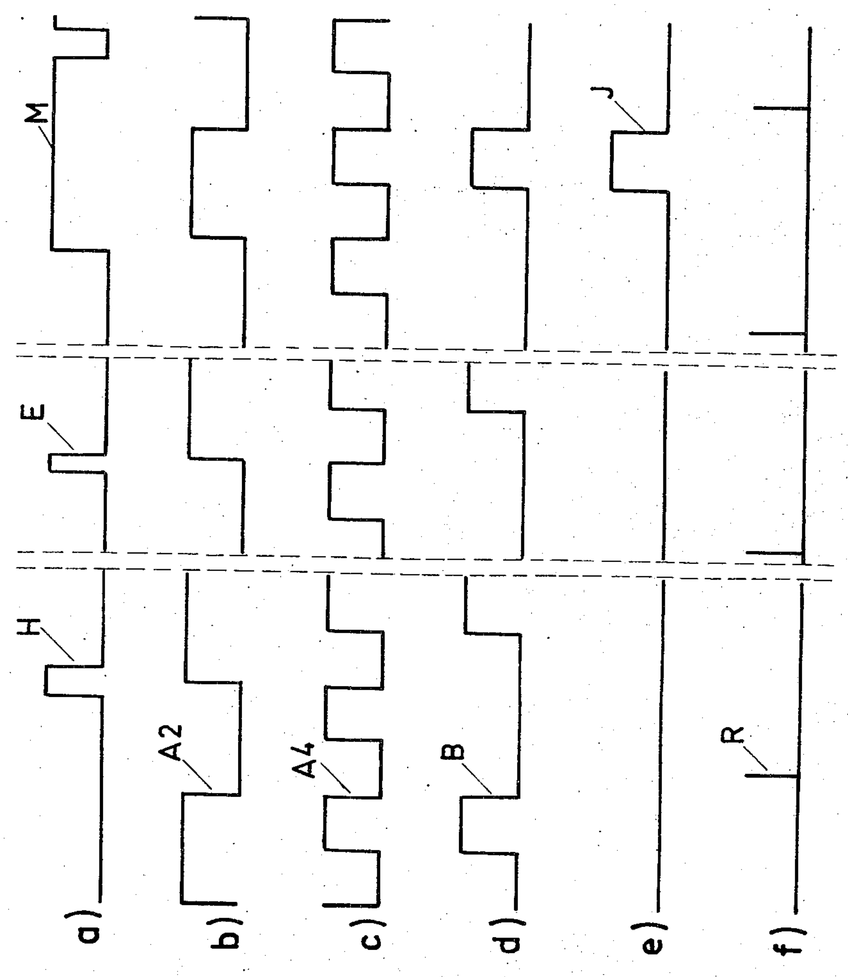
FIG. 2 shows different signals occuring in the equipment of FIG. 1.

In FIG. 2, at a), the input mixed sync. signal, here assumed to be positive in order to simplify the explanation, has been illustrated during three time intervals separated in the drawing by a double vertical dotted line.

The first of those three time intervals is part of a line blanking interval of an active field period, comprising a line sync. pulse H (duration $4.7\mu s$).

The second of these time intervals is part of a field blanking interval comprising an equalizing pulse E (duration $2.35\mu s$).

The third time interval is another part of a field blanking interval comprising one, M, of the five field sync. pulses of duration $27.3\ \mu s$ which are separated from one another by intervals of $4.7\ \mu s$.

At b) and c), the signals $A_2$ and $A_4$ for the same time intervals have been shown.

The signals $A_2$ and $A_4$ are respectively applied to the two inputs of an AND gate, 51, delivering a signal B shown at *d*) in FIG. 2. This signal is formed by pulses of $T/8 = 8\mu s$ at the frequency 2F, the trailing flanks of these pulses preceding the leading edges of the pulses H, of duration $4.7\mu s$, by a time of $16 - 2 = 14\mu s$.

The output pulses from the gate 51 are applied to an input of an AND gate 52, whose second input receives the input mixed sync. signal coming from the circuit 3. It will be immediately evident, from a comparison of the signals of rows *a* and *d*, that the gate 52 does not deliver an output signal for any of the pulses H.

During the time of the field blanking intervals, the gate 52 does not deliver any signals either for the line sync. pulses or for the equalizing pulses such as the pulse E (FIG. 2, a) of the mixed sync. signal.

On the other hand, a positive pulse of the signal B will occur during each of the five field sync. pulses, such as the pulse M (FIG. 2, *a*), and the gate 52 will supply five corresponding pulses J of duration $8\mu s$, one of which has been marked at *e*) in FIG. 2. The leading edges of those five pulses are separated by intervals of $T/2 = 32\mu s$.

These five pulses are applied to the reset input 28 of a binary counter 15.

The counting input 29 of the counter is connected to the output 22 of the divider circuit 12, dilivering the signal $A_2$, through of a variable delay device 14, the latter likewise being a monostable multivibrator, the duration *x* of the quasi-stable state of which may be varied between 1 and $6\mu s$, by means of a control knob A.

The counter advances by one unit for each descending flank of the signal $A_2$ delayed by the time x by means of the monostable multivibrator 14.

These delayed flanks R, which are responsible for the counting, are represented at *f*) in FIG. 2 where it has been assumed that $x = 4\mu s$. The trailing edges of the pulses J coincide in time with the descending flanks of the signal A2 and since the delay *x* ranges between 1 and $6\mu s$ there can be no coincidence between a pulse J and an advance of the counter.

The counter 15 includes two output decoders which successively and respectively deliver, at the two outputs 41 and 42 of the counter, two pulses for two states N and N', of the counter. These two pulses are applied respectively to the two inputs of a bistable multivibrator 16 supplying an output pulses corresponding to a "leading" field blanking signal.

The leading is obtained by adjusting $x$ in the following manner :

Considering the field blanking intervals associated with the input sync. signal, the trailing edge of the fifth, $J_o$ , of the five pulses J generated during any one of these intervals, will occur at a time $t_o$ which is separated by a fixed duration D from the start of the next field blanking interval.

A field blanking pulse leading by z will thus have to begin at the instant $t_o + D - z$.

On the other hand, the pulse marking the start of the leading field blanking pulse, appears at the time $$t_o + x + (N-1)\ T/2$$

$N$ and $x$ must therefore satisfy the relationship
$D - z = x + (N-1)\ T/2$ where $N$ is an integer
$x + z = D - (N-1)\ t/2.$ Calculation shows that $$x + z = 14 \mu s$$

and that consequently the phase lead $z$ obtained in the field blanking signal will vary from 8 to 13 $\mu$s when $x$ varies from 6 to 1$\mu$s.

It will be observed that the phase lead obtained for the field blanking signal varies between 8 and 13$\mu$s while the "general phase lead" has been indicated in this embodiment as being variable between 0 and 5$\mu$s. This corresponds to the requirement of certain central controls that the field blanking signal of the output video signals from the equipment shall be produced with a constant lead K in relation to the field blanking signals associated with the input sync. signal. This lead K which for field blanking purposes is added to the general phase lead, has here been taken to be equal to 8$\mu$s.

As far as N' is concerned, this is equal to N plus the number of half line periods occurring in a field blanking interval.

The "leading" field blanking signal S is supplied to the second input 82 of the camera circuits 8 for generating the requisite field frequency signals, these likewise being obtained using monostable multivibrators.

It will be observed that the length of the connections between the channel control and camera has not been allowed for in the field frequency signals utilized in the camera, and in fact the length of these connections can be neglected here.

As indicated hereinbefore, the signal S is supplied to the second input 92 of circuits 27 in the channel control.

The channel control, finally, comprises circuits 30 for generating "the leading" mixed sync. signal, the latter being transmitted on the one hand to the central control together with the output video signals, and on the other hand being utilized for the camera viewing screen signals and video frequency monitors associated with the channel control.

The circuits 30 have an input 31 which is supplied from the output 84 of the separator 4 with the line frequency signal generated and utilized in the separator, an input 32 receiving the signal $A_2$ from the divider circuit 12 and an input 33 receiving the signal S from the multivibrator 16 .

Figure 3:
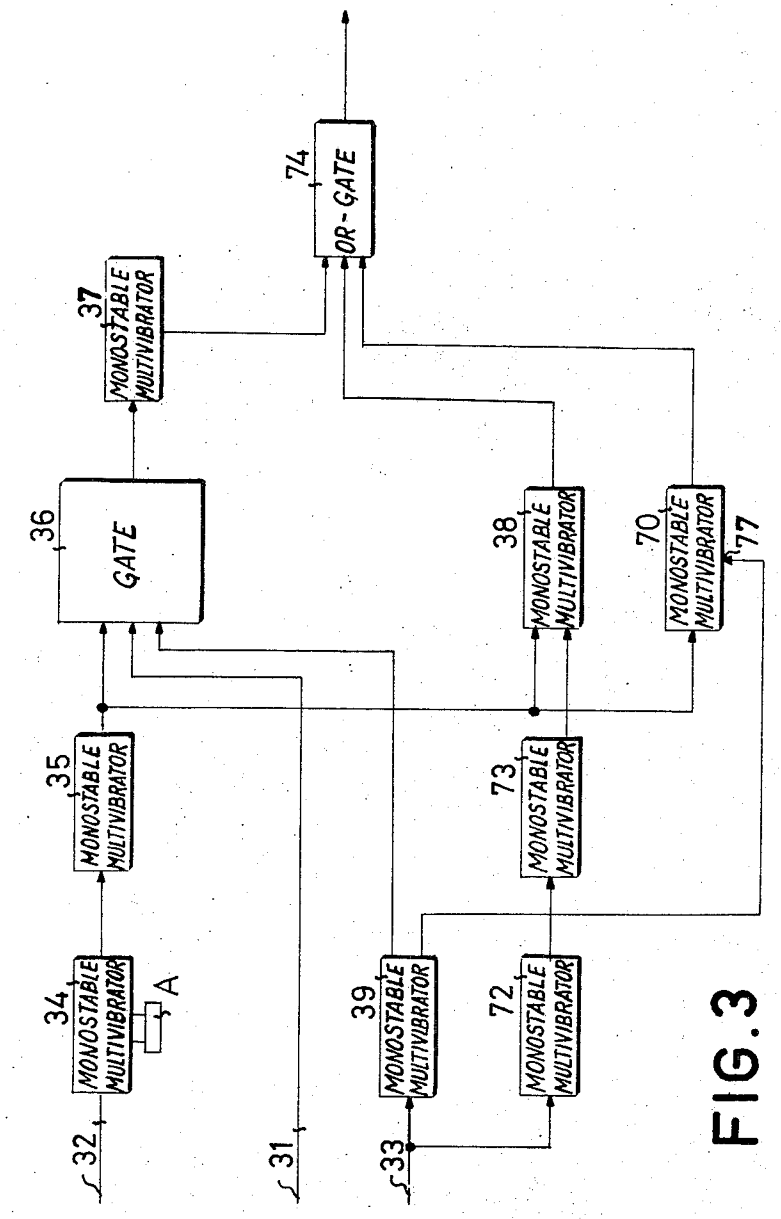
FIG. 3 is the detailed circuit of an element of the diagram shown in FIG. 1.

An embodiment of the circuits 30 is shown in FIG. 3 where the three inputs 31, 32 and 33 are shown again.

The input 32 which receives the signal $A_2$ is connected to the input of a monostable multivibrator 34 the duration of the quasi-stable state of which may be varied by means of a control knob A . This monostable multivibrator is triggered by the descending flanks of the signal A2 and for each of them produces a pulse (the duration of which may be set between 8 and 18$\mu$s by operation of the control knob A). The trailing edge of this pulse triggers another monostable multivibrator 35 the duration of the quasi-stable state of which is 1$\mu$s. The output pulses from the multivibrator 35 will be referred to as pulses I . Considering the diagram of FIG. 2 , it will be seen immediately that thus, for each line sync. signal H of the input mixed sync. signal, a pulse $I_1$ can be obtained whose trailing edge precedes the pulse H by a time variable between 5 and 0$\mu$s, and a pulse $I_2$ delayed by T/2 in relation to the first.

The pulses I, of frequency 2 F will be used to trigger all the pulses of the "leading" mixed sync. signal by means of gating or inhibiting signals which in each case allow only useful pulses to be produced.

It should be pointed out that the gating and inhibiting signals may have a phase and a duration which is independent of the duration of the general phase lead, since the latter varies between 0 and 5$\mu$s while the time interval separating two consecutive pulses I, is 32 − 1 = 31$\mu$s.

To produce the line sync. pulses, the pulses I are applied to the first input of a gate 36 with three inputs. This gate is supplied at its second input with the signal of frequency F received at the input 31 of the circuit, this signal eliminating the pulses $I_2$ .

The gate 36 is supplied at its third input with a signal which blocks those of the pulse I which are designed to produce the equalizing pulses, the blocking signal being obtained by means of a monostable multivibrator 39 triggered by the leading edge of signal S .

The pulses I left in the output signal from the gate 36 , trigger a monostable multivibrator 37 delivering the "leading" line sync. pulses.

To produce the equalizing pulses, the pulses I of frequency 2F are applied to the triggering input of a monostable multivibrator 70 the duration of the quasi-stable state of which is equal to that of the equalizing pulses. This multivibrator also has an input connected to a second output of the multivibrator 39 which inhibits it except during the appropriate time intervals.

To produce the field sync. pulses, the pulses I are finally applied to a monostable multivibrator 39 the duration of the quasi-stable state of which corresponds to that of the field sync. pulses; this multivibrator has a control input which ensures that it is triggered only by the five appropriate pulses, the corresponding control signal being obtained by means of two series-connected monostable multivibrators 72 and 73 , the first of which is supplied with the signal S . The multivibrator 72 determines the phase of the signal applied to the control input and the multivibrator 73 its duration.

The outputs of the monostable multivibrators 37, 38 and 70 are connected to the three inputs of an OR-gate 74, delivering the "leading" mixed sync. signal.

It should be emphasized that all the circuits described in FIGS. 1 and 3 , can be operated, for the production of signals having tight phase and duration tolerances, simply with monostable multivibrators the duration of whose quasi-stable states, variable or not, is sufficiently limited for the stability of said duration to be satisfactory.

The long delays obtained by means of monostable multivibrators only affect the phase or duration of gating or inhibiting signals in respect of which the general organization of the circuits enables wide tolerances to be used.

Self-evidently, circuit modifications are entirely within the scope of the person skilled in the art. Thus, the pulses J for resetting the counter 15 could be obtained by a coincidence device other than the gates 51 and 52.

The connections between camera and channel control can take the form of multiple lines or, for that matter, may be constituted by multiplex channels. In this context, the frequency of the channel control can be made equal to a multiple of 4F in order to produce multiplexing signals of higher frequency than 4F .

The invention has been described in the context of a camera equipment utilized to supply video signals relating to an action taking place at the time of scanning. It goes without saying that it is equally applicable to similar scanning equipments utilized in television work, such as equipment for scanning films, transparencies, etc.

I claim:

1. A synchronizing device allowing it to give to the signals from a television scanning equipment a variable phase lead relatively to an input synchronizing signal from a central control, said equipment comprising a camera unit, a channel control unit and cable means for linking said camera unit and said control unit at an adjustable distance from each other, said synchronizing device comprising camera circuits located in said camera unit and channel control circuits located in said channel control unit, and said input synchronizing signal being the mixed line and field sync. signal, or enabling such a signal to be reconstituted,the received or reconstituted mixed line and field signal being referred to as the "input mixed sync. signal" ;

said camera circuits comprising : a line frequency generator having a phase control input ;

said control channel circuits comprising : means for receiving said input synchronization signal : a phase comparator having a first input for receiving the line sync. pulses of the input mixed sync. signal, a second input, and an output coupled to said phase control input ; a controllable variable delay device having an input coupled to said line frequency generator and an output coupled to said second input of said phase comparator ; a generator producing signals at a frequency equal to 4 $qF$ , $q$ being a positive integer, followed by a divider circuit which enables three signals of frequencies $F = 1/T$ , 2F and 4F to be obtained, and a phase control loop locking the phase of said last mentioned generator to that of the line sync. pulses of the input mixed sync. signal ; and a phase-lead field frequency circuit for generating a field blanking signal having a lead, relatively to the phase of the corresponding signal associated with said input mixed sync. signal, said phase-lead field frequency circuit comprising a further adjustable variable delay device, and a counter coupled thereto ; a coincidence circuit for receiving said signals of frequency 2F and 4F , and the input mixed sync. signal, the output signal from this circuit, for each field period, being formed by $n$ ($n$ being a positive integer) pulses of duration T/8 each of which coincides in time with part of a field sync. pulse of the input mixed sync. signal, said $n$ pulses of duration T/8 being applied through said further adjustable variable delay device to reset said counter to zero, said counter having two outputs and comprising two decoders for respectively supplying two pulses at said two outputs of the counter when the latter passes through two given states, said phase-lead field frequency circuit further comprising a bistable multivibrator , having two inputs respectively connected to said outputs of said counter , for delivering said field blanking signal with a phase-lead.

2. A synchronizing device as claimed in claim 1, wherein the channel control circuits comprise a circuit for producing a mixed sync. signal having a phase-lead relatively to said input mixed sync. signal, said last-mentioned circuit being coupled for receiving said field blanking signal with a phase-lead, said signal of frequency 2F and an auxiliary signal of frequency F , and comprising a variable delay device supplied with said signal of frequency 2F , the output signal of said variable delay device triggering the production of triggering pulses which determine the phase of all the pulses in said mixed sync. signal having a phase-lead.

* * * * *